United States Patent [19]
Nichols

[11] Patent Number: 5,953,852
[45] Date of Patent: Sep. 21, 1999

[54] FISHING BOBBER

[76] Inventor: Rufus Nichols, 3808 Meriwether Dr., Durham, N.C. 27704

[21] Appl. No.: 08/855,003

[22] Filed: May 13, 1997

[51] Int. Cl.[6] .................................................. A01K 91/00
[52] U.S. Cl. .............................................................. 43/44.87
[58] Field of Search .............................. 43/44.87, 92, 93, 43/95

[56] References Cited

U.S. PATENT DOCUMENTS

| | | | |
|---|---|---|---|
| 235,510 | 12/1880 | Chubb | 43/44.92 |
| 615,078 | 11/1898 | Lubbock | 43/44.92 |
| 1,019,950 | 3/1912 | Colley | 43/44.92 |
| 4,359,836 | 11/1982 | Yuji | 43/44.87 X |

*Primary Examiner*—Thomas Price

[57] ABSTRACT

A new fishing bobber for floating the end of a fishing line. The inventive device includes a float member having a cylindrical upper portion, a conical lower portion, and a cylindrical balancing portion between the upper portion and the lower portion. Preferably, the balancing portion is cylindrical in shape and has larger diameter than the upper portion and the lower portion. In use, the fishing bobber is attached to a fishing line by extending the fishing line through the ring members located at either end of the floating member. When the fishing bobber is in the water, the balancing portion of the float member causes the float member lower end to be oriented downwards.

8 Claims, 2 Drawing Sheets

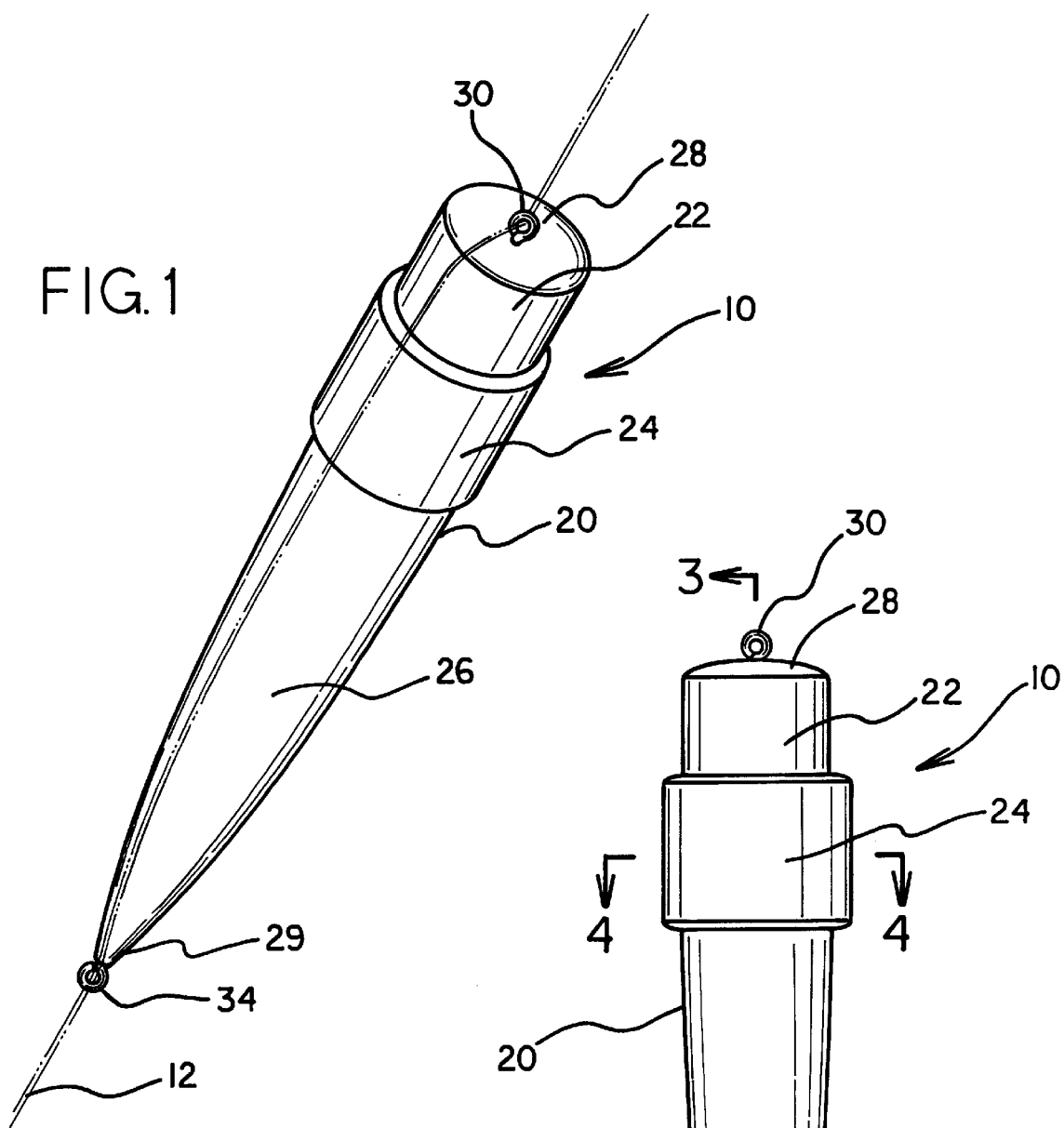

FISHING BOBBER

BACKGROUND OF THE INVENTION

1. Field of the Invention

The present invention relates to fishing bobbers and more particularly pertains to a new fishing bobber for floating the end of a fishing line.

2. Description of the Prior Art

The use of fishing bobbers is known in the prior art. More specifically, fishing bobbers heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing bobbers include U.S. Pat. No. 1111; U.S. Pat. No. 2222; U.S. Pat. No. 3333; U.S. Pat. No. 4444; U.S. Pat. No. 5555; and U.S. Pat. No. 6666.

While these devices fulfill their respective, particular objectives and requirements, the aforementioned patents do not disclose a new fishing bobber. The inventive device includes a float member having a cylindrical upper portion, a conical lower portion, and a cylindrical balancing portion between the upper portion and the lower portion. Preferably, the balancing portion is cylindrical in shape and has larger diameter than the upper portion and the lower portion. In use, the fishing bobber is attached to a fishing line by extending the fishing line through the ring members located at either end of the floating member. When the fishing bobber is in the water, the balancing portion of the float member causes the float member lower end to be oriented downwards.

In these respects, the fishing bobber according to the present invention substantially departs from the conventional concepts and designs of the prior art, and in so doing provides an apparatus primarily developed for the purpose of floating the end of a fishing line.

SUMMARY OF THE INVENTION

In view of the foregoing disadvantages inherent in the known types of fishing bobbers now present in the prior art, the present invention provides a new fishing bobber construction wherein the same can be utilized for floating the end of a fishing line.

The general purpose of the present invention, which will be described subsequently in greater detail, is to provide a new fishing bobber apparatus and method which has many of the advantages of the fishing bobbers mentioned heretofore and many novel features that result in a new fishing bobber which is not anticipated, rendered obvious, suggested, or even implied by any of the prior art fishing bobbers, either alone or in any combination thereof.

To attain this, the present invention generally comprises a float member having a cylindrical upper portion, a conical lower portion, and a cylindrical balancing portion between the upper portion and the lower portion. Preferably, the balancing portion is cylindrical in shape and has larger diameter than the upper portion and the lower portion. In use, the fishing bobber is attached to a fishing line by extending the fishing line through the ring members located at either end of the floating member. When the fishing bobber is in the water, the balancing portion of the float member causes the float member lower end to be oriented downwards.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new fishing bobber apparatus and method which has many of the advantages of the fishing bobbers mentioned heretofore and many novel features that result in a new fishing bobber which is not anticipated, rendered obvious, suggested, or even implied by any of the prior art fishing bobbers, either alone or in any combination thereof.

It is another object of the present invention to provide a new fishing bobber which may be easily and efficiently manufactured and marketed.

It is a further object of the present invention to provide a new fishing bobber which is of a durable and reliable construction.

An even further object of the present invention is to provide a new fishing bobber which is susceptible of a low cost of manufacture with regard to both materials and labor, and which accordingly is then susceptible of low prices of sale to the consuming public, thereby making such fishing bobber economically available to the buying public.

Still yet another object of the present invention is to provide a new fishing bobber which provides in the apparatuses and methods of the prior art some of the advantages thereof, while simultaneously overcoming some of the disadvantages normally associated therewith.

Still another object of the present invention is to provide a new fishing bobber for floating the end of a fishing line.

Yet another object of the present invention is to provide a new fishing bobber which includes a float member having a cylindrical upper portion, a conical lower portion, and a cylindrical balancing portion between the upper portion and the lower portion. Preferably, the balancing portion is cylindrical in shape and has larger diameter than the upper portion and the lower portion. In use, the fishing bobber is attached to a fishing line by extending the fishing line through the ring members located at either end of the floating member. When the fishing bobber is in the water, the balancing portion of the float member causes the float member lower end to be oriented downwards.

Still yet another object of the present invention is to provide a new fishing bobber that is shaped so that the motion of the fishing bobber in use is not affected by wind and water currents.

Even still another object of the present invention is to provide a new fishing bobber that that is resistant to damage from thermal shock and rigorous use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new fishing bobber attached to a fishing line according to the present invention.

FIG. 2 is a side view of the present invention.

DESCRIPTION OF THE PREFERRED EMBODIMENT

Figure 3:
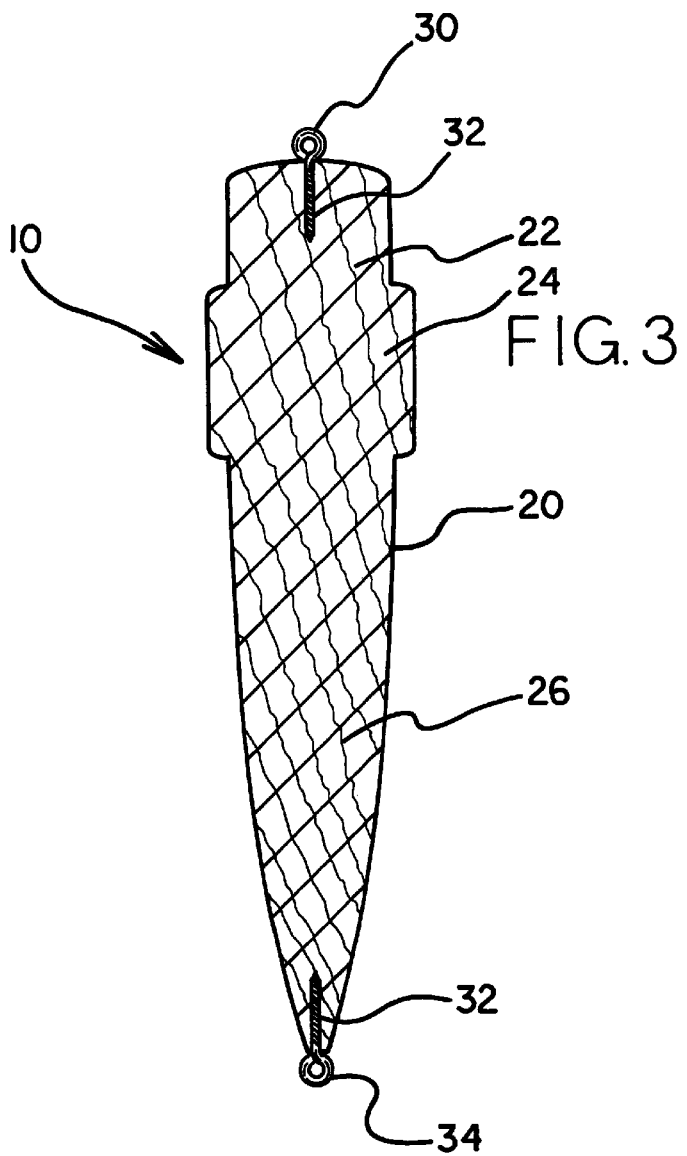
FIG. 3 is a sectional view taken form line 3—3 of FIG. 2 of the present invention.
Figure 4:
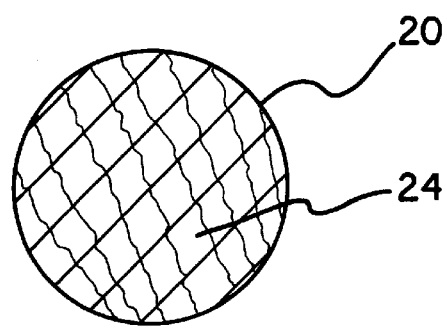
FIG. 4 is a sectional view of the present invention taken from line 4—4 of FIG. 2.

With reference now to the drawings, and in particular to FIGS. 1 through 4 thereof, a new fishing bobber embodying the principles and concepts of the present invention and generally designated by the reference numeral 10 will be described.

As best illustrated in FIGS. 1 through 4, the fishing bobber 10 comprises a float member 20 having a cylindrical upper portion 22, a conical lower portion 26, and a cylindrical balancing portion 24 between the upper portion 22 and the lower portion 26. The conical lower portion 26 tapers towards the lower end 29. Preferably, the balancing portion 24 is cylindrical in shape and has larger diameter than the upper portion 22 and the lower portion 26.

Attached to the upper end 28 of the float member 20 is a ring member 30. Ideally the ring member 30 is a threaded screw 32 with its unthreaded end shaped to form a loop. Similarly attached to the lower end 29 is an other ring member 34 of similar construction as the upper ring member 30.

In use, the fishing bobber 10 is attached to a fishing line 12 by extending the fishing line through the each of the ring members 30,34. This way, a hook at the end of the fishing line 12 may be maintained at a specific level within a body of water when the fishing bobber 10 is floating in the water.

Also, when the fishing bobber 10 is in the water, the balancing portion 34 of the float member 20 causes the float member lower end 29 to be oriented downwards.

The fishing bobber 10 may be made of any appropriate material for making fishing bobbers but, ideally, the float member 20 is made of wood such as pine or cedar.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. fishing bobber, comprising:
   a float member having an upper end and a lower end, said float member being tapered towards said lower end;
   an upper ring member having a hole being extended therethrough, said upper ring member being coupled to said float member upper end, said upper ring member hole being for extending a fishing line therethrough; and
   a lower ring member having a hole being extended therethrough, said lower ring member being coupled to said float member lower end, said lower ring member hole being for extending a fishing line therethrough; and
   wherein said float member has a balancing portion being positioned between said upper end and said lower end, said balancing portion being for orientating said lower end downwardly when said float member is floating in a body of water,
   wherein said balancing portion is cylindrical in shape, and said balancing member having a larger diameter than said upper portion and said lower portion.

2. The fishing bobber of claim 1, further comprising a flexible elongate fishing line being extended through said upper ring member hole and said lower ring member hole.

3. The fishing bobber of claim 1, wherein said float member has a cylindrical upper portion and a conical lower portion, said upper portion being positioned adjacent said upper end, said lower portion being tapered toward said lower end.

4. The fishing bobber of claim 1, wherein said upper ring member hole and said lower ring member hole are each orientated such that a respective line extending perpendicularly through a respective center of each said ring member hole is perpendicular to a longitudinal axis of said float member.

5. A fishing bobber, comprising:
   an elongated float member having a upper end and a lower end, said float member having a substantially circular cross-section along a length of said float member, said float member being tapered towards said lower end;
   an upper ring member structured to have an upper ring member hole, said upper ring member hole extending through said upper ring member, said upper ring member being coupled to said float member upper end, said upper ring member being positioned substantially aligned with a longitudinal axis of said float member, said upper ring member further being positioned such that a line extending perpendicularly through a center of said upper ring member hole is perpendicular to said longitudinal axis of said float member, said upper ring member hole being for extending a fishing line therethrough; and a lower ring member structured to have a lower ring member hole, said lower ring member hole extending through said lower ring member, said lower ring member being coupled to said float member lower end, said lower ring member being positioned substantially aligned with said longitudinal axis of said float member, said lower ring member further being positioned such that a line extending perpendicularly through a center of said lower member hole is orientated perpendicular to said longitudinal axis of said float member, said lower ring member hole being for extending a fishing line therethrough; and wherein said float member has a substantially band-shaped balancing portion, said balancing portion being positioned between said upper end and said lower end, said balancing portion being for orientating said lower end downwardly when said float member is floating in a body of water;

wherein said float member has a cylindrical upper portion and a conical lower portion, said upper portion being positioned adjacent said upper end, said lower portion being tapered toward said lower end; and wherein said balancing portion is cylindrical in shape, and said balancing member having a larger diameter than said upper portion and said lower portion.

6. The fishing bobber of claim 4, further comprising a flexible elongate fishing line being extended through said upper ring member hole and said lower ring member hole.

7. The fishing bobber of claim 4, wherein said float member has a cylindrical upper portion and a conical lower portion, said upper portion being positioned adjacent said upper end, said lower portion being tapered toward said lower end.

8. The fishing bobber of claim 7, wherein said balancing portion is cylindrical in shape, and said balancing member having a larger diameter than said upper portion and said lower portion.

\* \* \* \* \*